(12) United States Patent
Kennedy et al.

(10) Patent No.: US 10,480,664 B1
(45) Date of Patent: Nov. 19, 2019

(54) INTAKE MANIFOLD WITH PCV CHECK VALVE RETAINER

(71) Applicant: RB Distribution, Inc., Colmar, PA (US)

(72) Inventors: Patrick Thomas Kennedy, Perkasie, PA (US); Michael Paul Capko, Harleysville, PA (US); Timothy Lee Collins, Oxford, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/242,620

(22) Filed: Jan. 8, 2019

(51) Int. Cl.
*F16K 15/14* (2006.01)
*F02M 35/10* (2006.01)

(52) U.S. Cl.
CPC ......... *F16K 15/14* (2013.01); *F02M 35/1034* (2013.01); *F02M 35/10222* (2013.01)

(58) Field of Classification Search
CPC ....... F02M 35/10229; F02M 35/10222; F02M 35/104; F02D 2200/0406; F02D 2009/024
See application file for complete search history.

(56) References Cited

U.S. PATENT DOCUMENTS

| | | | | |
|---|---|---|---|---|
| 3,589,347 A | * | 6/1971 | Sawada | C21C 5/30 123/574 |
| 5,377,650 A | | 1/1995 | Warner | |
| 2003/0106516 A1 | | 6/2003 | Nishimura et al. | |
| 2004/0261745 A1 | | 12/2004 | Kito et al. | |
| 2005/0016487 A1 | * | 1/2005 | Ikuma | F02B 27/0263 123/184.42 |
| 2006/0243329 A1 | | 11/2006 | Doble | |
| 2008/0092864 A1 | * | 4/2008 | Suzuki | F01M 13/023 123/574 |
| 2013/0019844 A1 | | 1/2013 | Kulkarni et al. | |
| 2014/0373953 A1 | | 12/2014 | Spanevello | |
| 2015/0020784 A1 | * | 1/2015 | Rice | F01M 13/0011 123/572 |
| 2018/0252129 A1 | | 9/2018 | Bonne et al. | |

OTHER PUBLICATIONS

CruzeTalk.com, Forums, "2011-2016 Cruze 1.4L PCV System Explained", https://www.cruzetalk.com/forum/34-gen1-1-4l-turbo/175793-2011-2016-cruze-1-4l-pcv-system-explained.html#post2549201 (Aug. 22, 2016).
Dre Dan, YouTube, "Chevy Cruze & Sonic 1.4L Turbo PCV Issues, Diagnosis, and Solutions" (published Jun. 2, 2018) available at https://www.youtube.com/watch?v=En4WO7DYsTk.

* cited by examiner

*Primary Examiner* — Long T Tran
(74) *Attorney, Agent, or Firm* — Volpe and Koenig, P.C.

(57) ABSTRACT

An intake manifold with an internal check valve that operates in coordination with a Positive Crankcase Valve has a check valve retainer that is mounted within the manifold and contacts the check valve to maintains the check valve in position and avoid dislodgement.

4 Claims, 5 Drawing Sheets

INTAKE MANIFOLD WITH PCV CHECK VALVE RETAINER

FIELD OF INVENTION

The present invention relates generally to securing a check valve against being dislodged from intended position. More particularly, the invention relates to securing a check valve that is positioned with a manifold.

BACKGROUND

Certain engines, such as those found in the Chevrolet Cruz and Buick encore, have a check valve in the intake manifold. These engines have a high failure rate associated with the check valve being dislodged from its intended position.

The intake manifold basically has two chambers. The intake chamber and the PCV chamber with the check valve, which is an umbrella or mushroom like diaphragm that is retained in position by a nipple that is held with a press fit. The check valve allows positive crankcase ventilation (PVC) of combustion gases that by pass the piston rings into the crankcase. When the check valve is open, the PCV recycles the air into the intake chamber. When there is a load that creates a pressure boost, the check valve closes and prevents the flow of air into the crankcase. When the check valve is dislodged and fails to function properly, there is a back flow into the crankcase.

In other words, proper engine operation, the check valve allows gas to freely flow into the intake chamber when the engine is under vacuum, but block that gas flow under boost conditions. While the original equipment manufacturer (OEM) intake manifold check valve initially works well, it fails prematurely and can disappear altogether when it is dislodged.

Some prior attempts are correcting the problem have suggested method of modifying the manifold and there are kits available for that purpose. However, such modification may have unintended consequences if not performed by a skilled mechanic or may void some aspects of the manufacturer's warranty.

Accordingly there is a need for better securing the check valve in its proper operating position.

SUMMARY

The present invention maintains the OEM design of the intake chamber and PCV chamber by providing an insert that fixes the check valve in the proper location and avoid dislodging of the check valve.

BRIEF DESCRIPTION OF THE DRAWINGS

The solution of the present invention will be better understood with reference to the following drawings where.

DETAILED DESCRIPTION OF THE PREFERRED EMBODIMENTS

Figure 1:
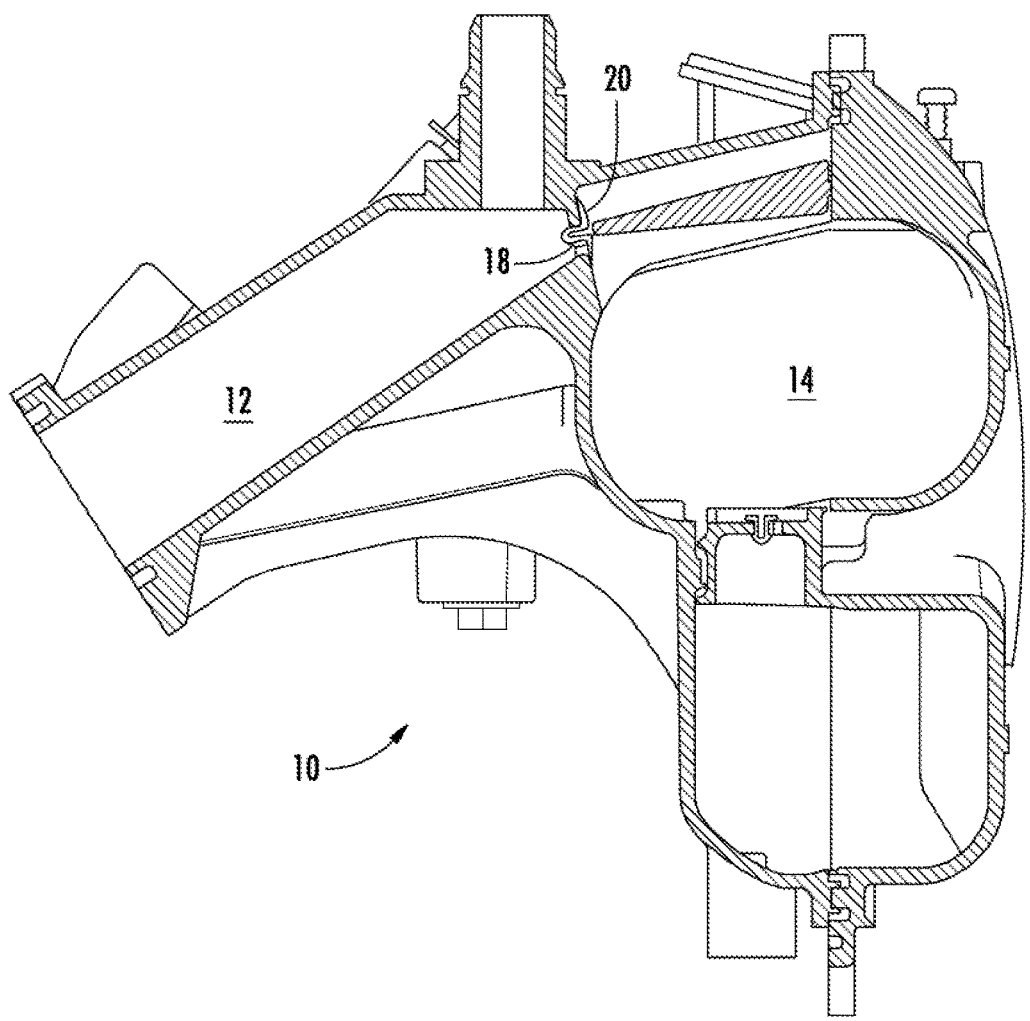
FIG. 1 illustrates a sectioned manifold to locate the internal PVC check valve in the manifold and the placement of the retainer.
Figure 2:
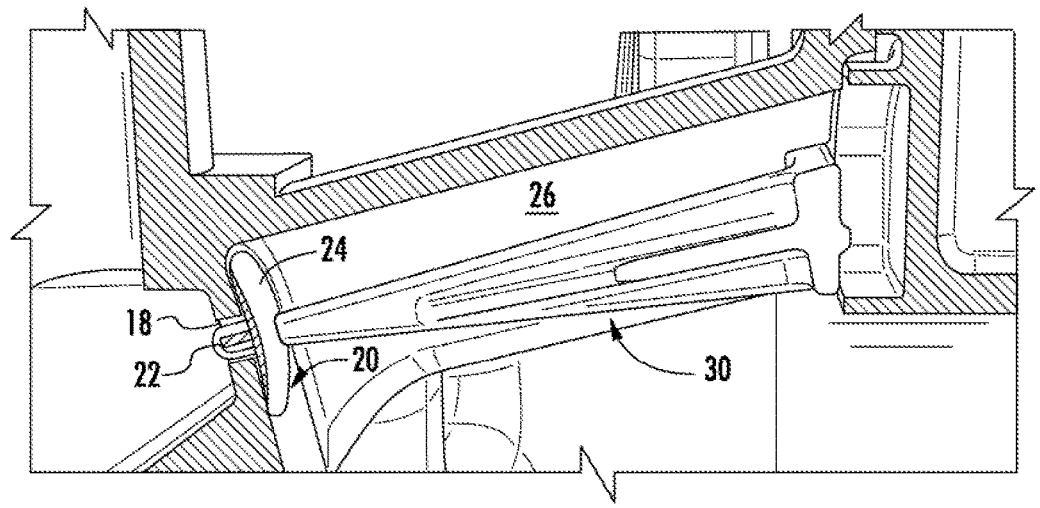
FIG. 2 is an enlarged illustration of the illustration of the retainer in contact with the check valve.

With reference to FIGS. 1 and 2, the manifold 10 is typically molded in at least two sections or shells and they are welded together to form the chambers 12 and 14 on either side of an interior wall 16 that has a plurality of gas exchange vent holes 16-1 to 16-X and a central opening 18 that secures a check valve 20 so that the check valve is wholly within the manifold 10. The gas exchange vent holes 16-1 to 16-X around a central opening 18 are in accordance with OEM specifications and the central opening is dimensioned to receive a nipple 22 extending from the check valve 20 in accordance with OEM specifications. The check valve 20 has a slightly curved cap 24, shaped somewhat like a mushroom or an umbrella, which forms a movable flap. The preferred retainer 30 contacts the top of cap 24 directly over the nipple 22 so it does not interfere with the operation of the cap 24.

Figure 3:
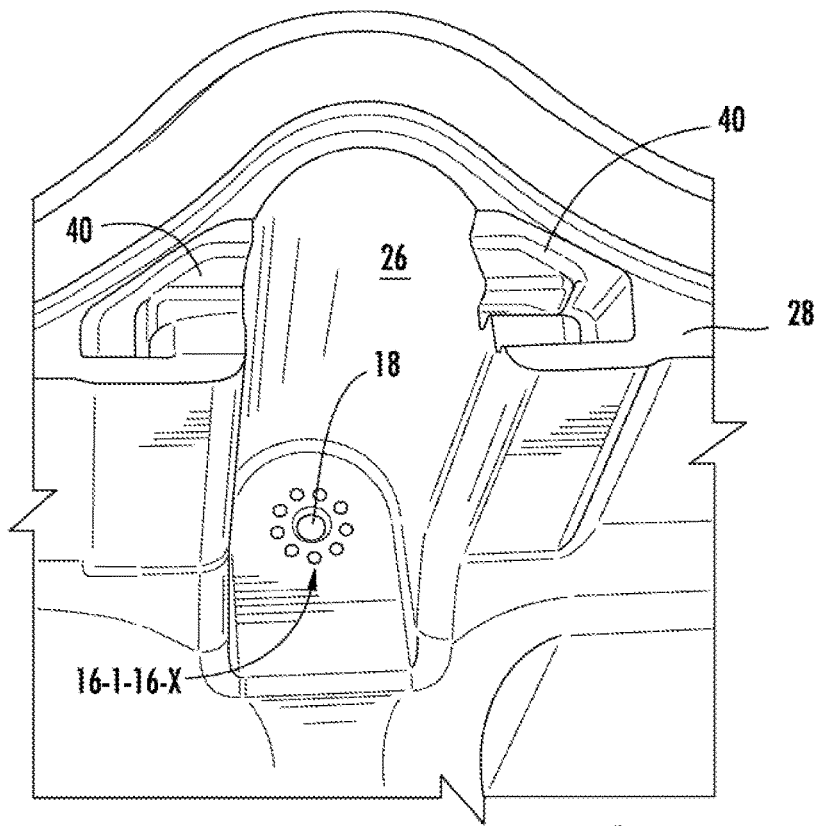
FIG. 3 illustrated the manifold position of the check valve without the check valve in place.
Figure 4:
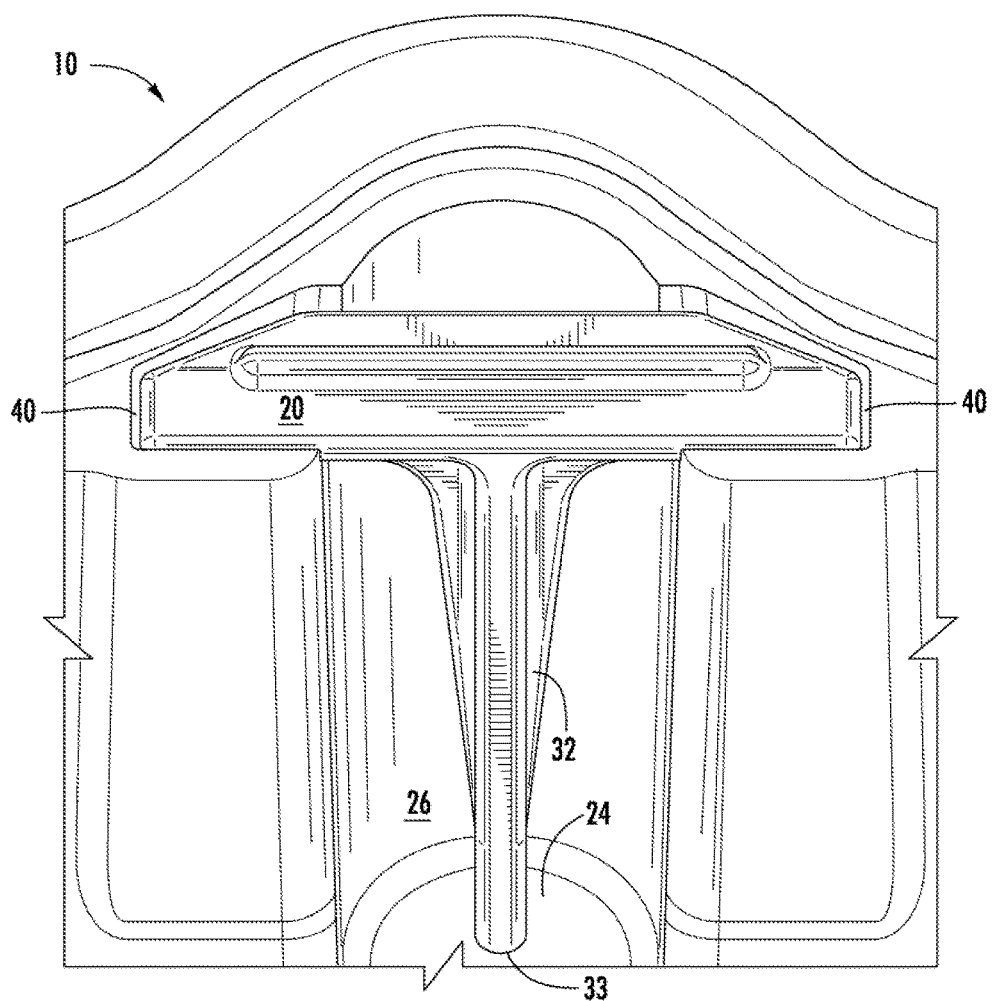
FIG. 4 illustrates the retainer and check valve in place within the manifold cavity illustrated in FIG. 3.

With reference to FIG. 3, the gas exchange area 16 forms a floor in an arcuate chamber 26 which has a modified upper surface 28 that receives retainer 30. The upper surface 28 is modified from the OEM configuration to have two wells or recesses 40 on the sides of arcuate chamber 26. The recesses 40 are shaped to receive the retainer 30 without interference to the manifold sections sealing and with minimum restrictions to flow in the arcuate chamber 26. The retainer 30 is preferably heat staked and held in place between the sections of manifold 10.

Figure 5:
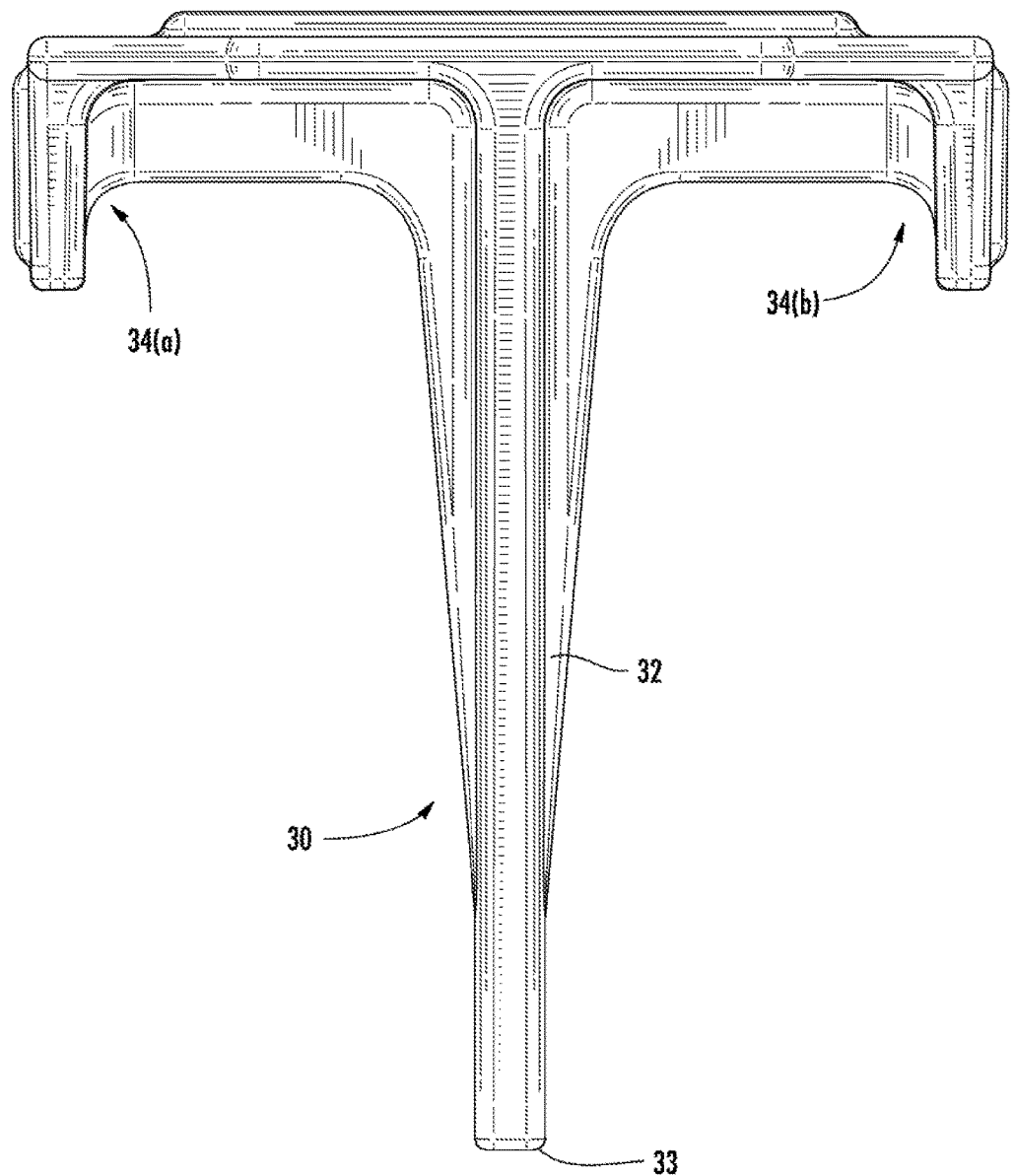
FIG. 5 illustrates a retainer configuration.
Figure 6:
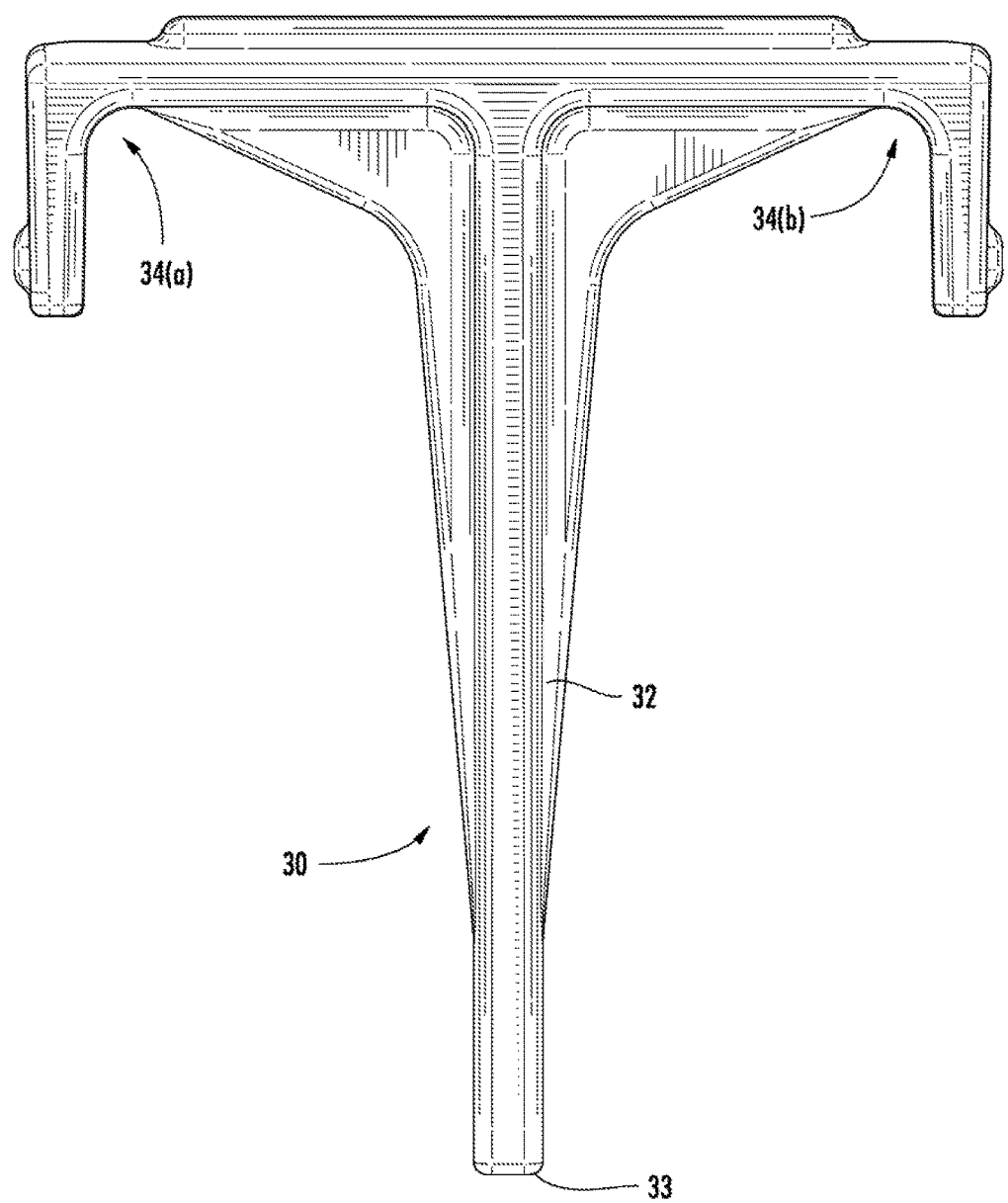
FIG. 6 illustrates an alternative retainer configuration.

With reference to FIGS. 5 and 6, the retainer 30 has a post or stem 32 with a length below the shoulders 34(a) and 34(b) so that the tip 33 engages the cap 24 when the shoulders 34(a) and 34(b) are positioned in the respective well or recess 40 of the manifold 10. The width or space between the shoulders is preferable selected to span the width of the arcuate chamber 26. The shape and degree of taper of the stem 32 between tip 33 and shoulders 34(a) and 34(b) can be selected to facilitate molding of the retainer 30 and the thickness or heft of the retainer 30 is determined by the material selected to mold the retainer 30. The selected molding material should have thermal properties sufficient to withstand the range of engine temperatures without deforming. PA6 (nylon 6) with 30% Glass Fill has been found to be an acceptable molding material for the retainer and the manifold.

What is claimed is:

1. A manifold comprising:
a body of at least two sections that are joined together to form first and second chambers on either side of a separating wall;
a first recess formed in a first of the at least two sections at a first predetermined distance from the separating wall;
a second recess formed in a second of the at least two sections at a second predetermined distance from the separating wall;
a plurality of vent holes are formed in the separating wall around a central opening that is dimensioned to receive a first portion of a check valve;
the check valve has the first portion positioned in the central opening and a second portion that overlies the plurality of vent holes in the separating wall; and,
a check valve retainer with a first end having a first retainer portion and a second retainer portion, the first retainer portion is dimensioned to be received within the first recess and the second retainer portion is dimensioned to be received within the second recess, and a second end that is spaced from the first end and maintains the first portion of the check valve in the central opening.

2. The manifold of claim 1, wherein the retainer has a first shoulder and a second shoulder, the first shoulder is received in the first recess and the second should is received in the second recess.

3. A manifold comprising:
a body of at least two sections that are joined together to form first and second chambers on either side of a separating wall, one of the first and second chambers is a PCV chamber and the other is an intake chamber;
a recess formed in at least one of the at least two sections at a predetermined distance from the separating wall;
a plurality of vent holes are formed in the separating wall around a central opening that is dimensioned to receive a first portion of a check valve;
the check valve has the first portion positioned in the central opening and a second portion that overlies the plurality of vent holes in the separating wall; and,
a check valve retainer with a first end dimensioned to be received within the recess and a second end that is spaced from the first end and maintains the first portion of the check valve in the central opening.

4. A manifold comprising:
at least two body sections that are joined together to define a first chamber, a second chamber, and wall separating the first chamber from the second chamber;
a recess formed in at least one of the at least two body sections at a predetermined distance from the wall;
a plurality of vent holes located in the wall around a central opening;
the check valve has a first portion positioned in the central opening and a second portion that overlies the plurality of vent holes; and,
a check valve retainer with a first end that is received within the recess and a second end that is spaced from the first end and maintains the first portion of the check valve in the opening; and,
the manifold and the retainer are molded of PA6 (nylon 6) with 30% Glass Fill.

* * * * *